United States Patent Office 2,994,641
Patented Aug. 1, 1961

2,994,641
STABILIZED LOTIO ALBA COMPOSITION
Alfred Halpern, Great Neck, N.Y., assignor to E. Fougera & Co., Inc., New York, N.Y., a corporation of New York
No Drawing. Filed Mar. 23, 1954, Ser. No. 418,233
2 Claims. (Cl. 167—72)

This invention relates to stabilized sulfur compounds and it has particular relation to stabilized sulfurated potash compounds, to products containing such stabilized compounds and to a process for the preparation of therapeutic sulfur compositions from sulfurated potash.

Sulfurated potash or liver of sulfur is a mixture of potassium polysulfide, $K_2S_x$, wherein $x$ can be 3, 4 or 5, and potassium thiosulfate ($K_2S_2O_3$). It contains not less than 12.8% of sulfur, in combination as the sulfide (S=). It has been used as a medicinal for a great number of years, although its extreme instability seriously limits this usage. It is this instability which accounts for the caution in the present National Formulary that it should not be dispensed in containers holding more than 120 grams of the product (National Formulary IX).

Arny and Associates (J. Amer. Pharm. Assoc. 20: 1153, 1931), found the stability of sulfurated potash to be only a few hours when exposed to the air and ascribed this instability to be due to oxidative changes. Numerous other workers have likewise investigated the decomposition of this compound and found that the compound absorbs moisture, oxygen and carbon dioxide with the conversion of the complex polysulfide into the carbonate, sulfate and thiosulfate.

No satisfactory method of preserving the properties of sulfurated potash has been found, except packaging in air-tight containers, which, however, is effective only until the container is opened.

The main object of the present invention is to provide a method of stabilizing sulfurated potash and to provide a stable sulfurated potash product, which can be directly exposed to air without decomposition or other undesired change, for a considerable period of time.

Another object of the invention is to provide stabilized sulfurated potash products which can be mixed with a chemical ingredient capable of reacting with the sulfurated potash, to a stable substantially dry mixture, the ingredients of which undergo a chemical reaction upon mixing the dry mixture with a liquid, particularly water or an aqueous fluid.

It is also an object of the present invention to provide a method of preparing solutions of predetermined composition, containing reaction products of sulfurated potash with other ingredients, particularly zinc sulfate.

Further objects and the advantages of the invention will be apparent from the appended claims and the following specification which describes by way of example and without limitation some embodiments of, and the best mode of carrying out, the invention.

It has been found that the instability of sulfurated potash can be greatly reduced by homogeneously mixing it under grinding with a water insoluble metal silicate which is inert to the sulfurated potash, and with a binder which does not chemically react with the sulfurated potash and the inert admixture, and is capable of exerting a cohesive attraction in the dry state. Examples of the metal silicates adapted to be used in carrying out the invention are aluminum silicate, magnesium silicates, aluminum-magnesium silicates, kaolin, china clays and bentonite. Examples of suitable binders are gum acacia, gum tragacanth, cellulose esters, e.g. carboxymethylcellulose, colloidal vegetable meal, such as oat meal, corn meal, starch, sodium or potassium carboxymethylcellulose, and guar gum. Mixing with grinding is carried out in a mill, preferably a ball mill, until the mixture is converted into powder. This powder can be mixed with suitable adjuvants and compressed into tablets or capsules or can be stored in powder form for indefinite periods of time in conventional containers.

Example I 10 parts of liver of sulfur are mixed with 10 parts of aluminum-magnesium silicate and with 2 parts of carboxymethylcellulose. The mixture is ground in a ball mill for about 2 hours and sifted so that a powder passing through a #60 mesh screen is obtained. The sifted material is then heated in a closed container at 40° C. for about ½ hour. The resultant powder conforms in every way with the sulfide requirements of sulfurated potash, even after exposure to the air for periods of a week or more.

Example II 10 parts of sulfurated potash are ground with 1 part of kaolin and ⅓ part of gum acacia in a ball mill. After 2 hours of grinding, additionally 1 part of kaolin and ½ part of gum acacia are added and grinding is continued until the particle size of the powdered mixture is such that it will pass through a #60 mesh screen. This powder is stable when exposed to the air for periods of one week or more.

Instead of kaolin an equal amount of bentonite or of another similar aluminum silicate clay can be used in this example.

The product thus obtained can be stored in conventional containers or mixed with suitable adjuvants and compressed into tablets or capsules. It is stable on storage for prolonged periods of time.

Example III

In place of the carboxymethylcellulose used in Example I, or in place of the gum acacia used in Example II, equal quantities of each of the following products, or mixtures of these products in any proportion, can be substituted: sodium or potassium carboxymethylcellulose, tragacanth, guar gum, corn meal, oat meal, and starch.

Example IV

In the procedure described in Example I, 10 parts of liver of sulfur, 5 parts of aluminum-magnesium silicate, and 2 parts of potassium carboxymethylcellulose are used, the process being carried out otherwise in the same manner as in Example I.

Example V

In the procedure described in Example II, 10 parts of sulfurated potash, 0.2 part of bentonite, 0.1 part of gum acacia and 0.1 part of gum tragacanth are used and the process is carried out otherwise in the same manner as in Example II.

Example VI

In the procedure described in Example I, 10 parts of liver of sulfur, 8 parts of kaolin and 3 parts of starch are used, the process being carried out otherwise in the same manner as in Example I.

In contrast to the commercial, conventional sulfurated potash, the products prepared in the above described manner are stable and retain their original condition and characteristics. There is no need to specially protect them by the exclusion of air or to package them in small or airtight containers, since the products prepared according to the invention are stable when stored in ordinary closed containers for long periods of time of e.g. one year and more.

It seems that in carrying out the invention the added substances, e.g. aluminum silicate clay and the binder, become intimately associated with, and form individual coverings on the sulfurated potash particles and protect the latter from influences which would tend to change or decompose the sulfurated potash.

The chemical properties of sulfurated potash are not altered by the process of the invention. It has been found that this process does not result in the undesirable properties ascribed to the coating of solid materials by Wershaw (see U.S. Patent No. 2,371,862) who notes that coating of a crystal will retard the time of reaction.

It is another advantage of the present invention that it permits the subdivision of sulfurated potash to a relatively small particle size, thereby facilitating mechanical manipulation. The subdivision of the now conventional, commercially available, large sulfurated potash particles, is not feasible, because the increased surface area of the subdivided particles would accelerate the destructive processes and further increase the instability of the active compound. The products embodying the present invention possess the improved stability in any fine subdivision.

Because of the solubility of sulfurated potash in water and in alcohol, the process of the invention must be accomplished in the dry state, preferably in the absence of air, but this latter condition is not absolutely essential.

In carrying out the invention, the added inert material is used in the ratio of from 1/50 part to 1 part for each part of sulfurated potash and the binder is used in the ratio of from 1/10 part to 1 part for each part of the added inert substance, in order to obtain a satisfactory, safe effect.

It has been further found that stable mixtures capable of storage under conventional storage conditions, can be obtained by mixing sulfurated potash stabilized in the above described manner, with substances which react with sulfurated potash in solution. The preferred example of such reactive substances is zinc sulfate.

It has been known to use as a very effective therapeutic agent for the management of acne vulgaris and similar dermatologic pathologies, the preparation called "lotio alba" which contains inorganic sulfides and precipitated sulfur.

This preparation which has enjoyed a popular usage for more than 60 years, has one distinct limitation, in that it must be freshly prepared because of the well-known instability of its ingredients. The current National Formulary, as well as all other previous official pharmacopoeial compendia, note the common admonition that this product must be freshly prepared prior to use.

The preparation of lotio alba involves the interreaction of sulfurated potash and zinc sulfate. Both these chemical agents, previously, have been separately dissolved in the appropriate quantity of water and filtered prior to admixture. The following reactions may be postulated for this preparation:

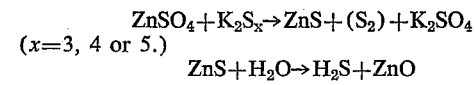

$$ZnSO_4 + K_2S_x \rightarrow ZnS + (S_2) + K_2SO_4$$
($x = 3$, 4 or 5.)
$$ZnS + H_2O \rightarrow H_2S + ZnO$$

In addition to the limitations involved in its preparation, the patient still does not receive the full value of this product because of the time elapsing between its compounding by the pharmacist and the use in the home. Furthermore, on storage in the home, during the period of therapy, the product is further decomposed, thereby nullifying beneficial effects to be obtained.

The problem of the proper preparation of lotio alba was approached from many viewpoints. Thus H. Goodman (J.A.Ph.A., Pract. Pharm. Ed., 3, 1942, p. 244), suggested that 2 separate solutions be dispensed, one containing the sulfurated potash and the other containing the zinc sulfate. Each solution is separately applied to the skin whereupon the reaction takes place. R.A. Foran, (J.A.Ph.A., 11, 1922, p. 624), in order to avoid the use of sulfurated potash of uncertain age and quality, suggested substitution of a solution of sulfur in KOH solution for the sulfurated potash in the lotio alba formula. O. Raubenheimer (J.A.Ph.A., 3, 1914, p. 692), suggested a method for making the sulfurated potash as needed, as the only sure way of getting the desired product.

It has been found that these difficulties, disadvantages and uncertainties in the preparation of lotio alba can be eliminated in a simple and convenient manner by using sulfurated potash stabilized according to the present invention and intimately mixing it with zinc sulfate in proper proportions so that on the addition of the necessary amount of water to this mixture, the desired reaction takes place and lotio alba is formed. Thus, for the first time, a convenient means for preparing this therapeutic agent extemporaneously, is available, without resorting to the separate solution of individual ingredients.

Lotio alba prepared in this way exerts a better therapeutic action, since the patient can use it immediately after preparation.

It has been further found that zinc sulfate proper can be used for stabilizing sulfurated potash by intimately mixing and grinding sulfurated potash with anhydrous zinc sulfate and one of the binding agents described above, i.e. a carbohydrate gum, for example gum acacia or gum tragacanth, or a cellulose derivative, e.g. carboxymethylcellulose or sodium carboxymethylcellulose, or a vegetable meal, e.g. corn meal, oat meal, or starch, as described further below.

*Example VII*

Four parts of sulfurated potash are mixed with 1 part of aluminum-magnesium silicate and 0.5 part of oatmeal and ground for 3 hours in a ball mill. The mixture is sifted and to it is added 4 parts of anhydrous zinc sulfate. The resultant powder may be further subdivided by additional grinding or packaged for use.

When 9.5 parts of this compound are added to 100 parts of water, a reaction takes place yielding the desired and therapeutically active sulfur derivatives found in freshly prepared lotio alba.

*Example VIII*

In place of the oatmeal used above, an equal quantity of one of the following binders or an equal quantity of a mixture of 2 or more of them can be substituted: gum acacia, gum tragacanth, guar gum, carboxymethylcellulose; sodium carboxymethylcellulose; corn meal and starch.

The procedure is the same as in Example VII.

*Example IX*

Four parts of sulfurated potash are mixed with 2 parts of carboxymethylcellulose and ground in a ball mill to a particle size so that it will pass through a number #20 screen. Four parts of anhydrous zinc sulfate are then added and the grinding process continued for 2 hours.

The resultant homogeneous powder, when added to water in the proportion of 1 part to 10, will react to form the therapeutically desirable sulfur derivatives of lotio alba.

*Example X*

One part of sulfurated potash is mixed with 1 part of anhydrous zinc sulfate and 0.35 part of gum acacia and ground for 3 hours in a ball mill. The mixture is sifted and the resulting powder is further subdivided by additional grinding or packaged for used. The resulting compound exhibits greatly improved stability in comparison with sulfurated potash.

In the product thus obtained, the zinc sulfate serves a dual role of being both the stabilizing or preserving agent, as well as the reactant. By admixing the product with the appropriate quantity of water, the desired therapeutic composition is readily obtained. The amount of binding agent in this example can be varied in the range of 0.05 to 0.5 part for each part of the sulfurated potash and instead of gum acacia an equal amount of any of the above mentioned other binding agents can be used.

*Example XI*

9½ parts of the powdered mixture obtained according to Example VII are mixed with ⅒ part of magnesium stearate. The mixture is compressed into a large pellet according to the process known as "slugging." By the dry granulation resulting from this slugging and by further comminution through a 60-mesh screen, a mixture is obtained which can be compressed in conventional manner into tablets of the desired size. When added to water, these tablets will form a solution containing the reaction products of zinc sulfate and sulfurated potash.

*Example XII*

In converting the powdered products of the invention into tablets, suitable additions, such as disintegrating agents, diluents, adhesives and lubricants can be added to the products of the invention to provide a composition suitable for compression into tablets.

A generalized formula of a composition suitable for tableting is as follows:

| | Percent |
|---|---|
| Powdered mixture obtained in the above Example I or VII | 83 |
| Diluent and adhesives, q.s. | 10 |
| Disintegrator | 5 |
| Lubricant | 2 |

These ingredients are mixed in dry, solid condition. The mixture is then granulated by a dry process, such as slugging, comminuted to a 60 mesh powder and compressed into tablets of the desired weight, size and shape.

The admixtures which are added in order to convert a powdered mixture into compressed tablets and are usually referred to as "adjuvants," include adhesives, diluents, disintegrants and lubricants. The adhesives are used to assist in the formation of hard granules suitable for forming tablets upon compression. Examples of common adhesives are cane sugar, acacia, dextrin, glucose, gelatin and pectin. As diluents, which are used to increase the weight of a tablet, e.g. milk sugar, talcum, starch, magnesium hydroxide, can be used. Disintegrators are substances which aid disintegration of the tablet when in contact with water or gastric juice; examples are potato starch, corn starch and agar. Lubricants are agents used for insuring uniform feeding of the powder to be tableted into the die and also to keep it from adhering to the punches during compression. Examples of lubricants are arrow-root, boric acid, calcium stearate, powdered waxes, cocoa butter, lycopodium, soaps, stearic acid and magnesium stearate. Any of these adhesives, diluents, disintegrators and lubricants, or mixtures of individual adhesives etc., can be used in the above generalized formula. It is not always necessary to use all of these agents, as shown by the above Example XI, in which only a lubricant is added to the powdered mixture to be tableted. However, it is essential that either slugging or another dry granulation process be used in tableting, because water would provide a medium for a reaction of the ingredients prior to their intended use.

The mixture described in the above Example XI can be filled into gelatin capsules, instead of being compressed into tablets. If filled in capsules, usually no further additives are required unless desired for the purpose of preparing a larger capsule than the bulk provides for. Should additives be required, any of the diluents, disintegrators, adhesives or lubricants can be used. The quantities to be added range from 1 to 10% depending on the purpose they are to serve. If machine capsuling is carried out, the lubricant can be added, for example, in a concentration of 2%. If the product is supposed to be used in veterinary medicine, where a larger capsule is common, more of the diluents is required. In the capsuling process too a dry granulating process is used.

It will be understood from the above examples, that the present invention permits the extemporaneous preparation of lotio alba by the patient without the necessity of previously dissolving separate ingredients, filtering and admixing, in order to obtain the desired therapeutic product. A freshly prepared composition is thus available at the time of use, thereby fulfilling the therapeutic requirements of the product.

Instead of mixing the zinc sulfate containing product of this invention with water, it can be mixed with aqueous-alcoholic liquids, for example an extract of witch hazel, whereby a product having the benefits of the alcohol and witch hazel, in addition to those of the lotio alba, is obtained.

It will be also understood that the present invention is not limited to the specific substances, proportions, steps and other details specifically described above and can be carried out with various modifications, a best mode of carrying out the invention being set forth in Example I.

For example, instead of, or in mixture with, the water insoluble metal silicates and the other protective substances described above, and instead of, or in mixture with, the binding agents described above, other protective substances and/or other binding agents can be used, as it has been found that satisfactory stabilization of sulfurated potash can be obtained if the following requirements are met: The protective substance must be substantially non-hygroscopic, chemically inert in dry condition to the sulfurated potash, and to the binding agent used, and, in the presence of the binding agent, capable of being intimately associated with and forming individual coverings on the sulfurated potash particles, and not enter into competitive reaction with the sulfurated potash in aqueous medium. The binding agent must be chemically inert to the sulfurated potash in dry condition and in aqueous medium. Protective substances and binding agents meeting these conditions, can be successfully used in carrying out the invention. Further examples of protective substances are aluminum oxides, aluminum hydroxides, magnesium oxides, magnesium hydroxides. As aluminum-magnesium silicates the products known in trade under the name "Veegum" can be used. Instead of anhydrous zinc sulfate, other substantially non-hygroscopic, water-soluble zinc salts can be used, which are essentially non-irritating and non-toxic in the concentrations used, such as $ZnSO_4 \cdot H_2O$, zinc acetate, zinc propionate and zinc ammonium chloride.

The terms "protective substance" and "binding agent" are used in the present specification and claims to denote the protective substances and binding agents, respectively, defined above and meeting the above requirements.

The "parts" and percent mentioned above are parts by weight if not otherwise stated. The sieve numbers stated above are those of the U.S. Bureau of Standards, standard screen series, 1919.

What is claimed is:

1. A stabilized sulfurated potash product consisting of finely subdivided sulfurated potash, the particles of which are intimately associated with a finely subdivided substantially water-insoluble metal silicate and a likewise finely subdivided plastic organic binding agent which is chemically inert to sulfurated potash in dry condition and in aqueous medium, zinc sulfate being incorporated as an additional ingredient in said product.

2. A stabilized sulfurated potash product consisting of finely subdivided sulfurated potash, the particles of which are intimately associated with a finely subdivided substantially water-insoluble metal silicate and a likewise finely subdivided plastic organic binding agent which is chemically inert to sulfurated potash in dry condition and in aqueous medium, anhydrous zinc sulfate being applied in said product to a ground mixture of sulfurated potash with the binding agent.

References Cited in the file of this patent

UNITED STATES PATENTS

| | | |
|---|---|---|
| 330,716 | Kennedy | Nov. 17, 1885 |
| 1,869,235 | Bartling | July 26, 1932 |
| 2,435,145 | Lalande | Jan. 27, 1948 |
| 2,484,637 | Mattocks | Oct. 11, 1949 |
| 2,550,015 | Maffitt | Apr. 24, 1951 |

FOREIGN PATENTS

| | | |
|---|---|---|
| 169,086 | Austria | Feb. 15, 1951 |

OTHER REFERENCES

Goodman: Cosmetic Dermatology, 1936, McGraw-Hill Book Co., New York, pp. 195–198, 199.

Janistyn: Riechstoff-Industrie, 1943, No. 2, pp. 20–23.